(12) United States Patent
Stevenson (10) Patent No.: US 10,144,245 B2
(45) Date of Patent: Dec. 4, 2018

(54) OVAL O-RING GROOVE FOR AIRCRAFT WHEELS

(71) Applicant: Goodrich Corporation, Charlotte, NC (US)

(72) Inventor: John Stevenson, Beauvercreek, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 123 days.

(21) Appl. No.: 14/939,340

(22) Filed: Nov. 12, 2015

(65) Prior Publication Data

US 2017/0136812 A1    May 18, 2017

(51) Int. Cl.
| | |
|---|---|
| *B60B 3/08* | (2006.01) |
| *B60B 25/00* | (2006.01) |
| *B64C 25/36* | (2006.01) |
| *B60B 25/22* | (2006.01) |

(52) U.S. Cl.
CPC .............. *B60B 3/08* (2013.01); *B60B 25/002* (2013.01); *B60B 25/006* (2013.01); *B60B 25/22* (2013.01); *B64C 25/36* (2013.01); *B60B 2900/325* (2013.01); *B60B 2900/511* (2013.01); *B60Y 2200/51* (2013.01)

(58) Field of Classification Search
CPC ..... B60Y 2200/51; B60B 3/08; B60B 25/006; B60B 25/36; B60B 2900/325; B60B 2900/511
USPC ............... 301/6.1, 6.2, 6.91, 64.303, 64.304, 301/64.305, 64.301, 64.302, 64.306
See application file for complete search history.

(56) References Cited

U.S. PATENT DOCUMENTS

| | | | |
|---|---|---|---|
| 3,044,154 A | 7/1962 | Moyer | |
| 3,201,174 A | 8/1965 | Stanton | |
| 5,855,257 A | 1/1999 | Wickert et al. | |
| 7,523,816 B2 | 4/2009 | Tong et al. | |
| 7,546,910 B2 | 6/2009 | Thorp et al. | |
| 8,020,943 B2 | 9/2011 | Kipp et al. | |
| 9,091,313 B2 | 7/2015 | Chelaidite et al. | |
| 2003/0140998 A1 | 7/2003 | Oba et al. | |
| 2004/0070260 A1* | 4/2004 | Chung ...................... B60B 3/08 301/59 |
| 2005/0236081 A1 | 10/2005 | Marsaly et al. | |
| 2006/0037685 A1 | 2/2006 | Clements et al. | |

(Continued)

FOREIGN PATENT DOCUMENTS

| | | |
|---|---|---|
| EP | 2397719 | 4/2013 |
| EP | 2743096 | 6/2014 |

OTHER PUBLICATIONS

Extended European Search Report dated Apr. 7, 2017 in European Application No. 16198191.5.
EP Office Action dated Mar. 8, 2018 EP App No. 16198191.5.

*Primary Examiner* — S. Joseph Morano
*Assistant Examiner* — Jean W Charleston
(74) *Attorney, Agent, or Firm* — Snell & Wilmer, L.L.P.

(57) ABSTRACT

Systems and apparatus for an oval O-ring groove for aircraft wheels may generally comprise an inboard wheel portion and an inboard O-ring groove. The inboard wheel portion may include an inboard rim located opposite of an inboard tubewell. The inboard tubewell may have an inboard mating surface located on an axially outward edge of the inboard tubewell. The inboard O-ring groove may be formed as a partial oval-shaped recess located on an outer edge of the inboard mating surface.

12 Claims, 5 Drawing Sheets

(56) References Cited

U.S. PATENT DOCUMENTS

| | | | |
|---|---|---|---|
| 2012/0091666 A1 | 4/2012 | Kipp et al. | |
| 2012/0248855 A1 | 10/2012 | Shamo | |
| 2014/0175860 A1* | 6/2014 | Crescenzo | B60B 25/00 |
| | | | 301/64.305 |
| 2014/0292060 A1* | 10/2014 | Phillis | B60B 15/00 |
| | | | 301/41.1 |
| 2015/0273938 A1* | 10/2015 | Delayre | B60B 21/04 |
| | | | 301/95.11 |

* cited by examiner

OVAL O-RING GROOVE FOR AIRCRAFT WHEELS

FIELD

The present disclosure relates to aircraft wheels, and more specifically, to an oval O-ring groove for an aircraft wheel.

BACKGROUND

O-ring grooves may experience fatigue in aircraft wheels. Current O-ring groove designs can create high-stress gradients due to the size of the groove radius, depth of the groove and the proximity to bolted joints, as well as the load path from the wheel tubewell through tie bolts. This resulting high-stress gradient can lead to unpredictable fatigue life at the O-ring groove.

SUMMARY

In various embodiments, a wheel for an aircraft may comprise an inboard wheel portion and an inboard O-ring groove. The inboard wheel portion may include an inboard rim located opposite of an inboard tubewell. The inboard tubewell may have an inboard mating surface located on an axially outer edge of the inboard tubewell. The inboard O-ring groove may be formed as a partial oval-shaped recess located on an outer edge of the inboard mating surface.

In various embodiments, an aircraft wheel may comprise an inboard wheel portion, an at least one inboard O-ring groove, an outboard wheel portion, and an at least one outboard register. The inboard wheel portion may include an inboard rim located opposite of an inboard tubewell. The inboard tubewell may have an inboard mating surface located on an axially outer edge of the inboard tubewell. The at least one inboard O-ring groove may be formed as a recess located on an outer edge of the inboard mating surface. The outboard wheel portion may include an outboard rim located opposite of an outboard tubewell. The outboard tubewell may have an outboard mating surface located on an axially outer edge of the outboard tubewell. The outboard mating surface may be configured to removably couple to the inboard mating surface. The at least one outboard register may be formed as a recess extending axially inward on an outer edge of the outboard mating surface.

In various embodiments, a wheel assembly may comprise an inboard wheel portion, an inboard O-ring groove, an outboard wheel portion, and an outboard register. The inboard wheel portion may include an inboard rim located opposite of an inboard tubewell. The inboard tubewell may have an inboard mating surface located on an axially outer edge of the inboard tubewell. The inboard O-ring groove may be formed as a partial oval-shaped recess located on an outer edge of the inboard mating surface. The outboard wheel portion may include an outboard rim located opposite of an outboard tubewell. The outboard tubewell may have an outboard mating surface located on an axially outer edge of the outboard tubewell. The outboard mating surface may be configured to removably couple to the inboard mating surface. The outboard register may be formed as a partial recess extending axially inward on an outer edge of the outboard mating surface, wherein a valley of the recess of the outboard register is flat.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Aircraft wheels are an important component of an aircraft landing system. With tires mounted on the wheels, the aircraft wheels support the entire weight of an aircraft during takeoff and landing. Typical modern aircraft wheels are comprised of two pieces: an inboard wheel portion and an outboard wheel portion. These two wheel portions are generally held together, such as, for example, by a bolt, and the two wheel portions contain an O-ring groove and/or register at the mating surface of each wheel portion for an O-ring. The O-ring is designed to form an air-tight seal to the aircraft wheel when the inboard wheel portion is coupled to the outboard wheel portion. Because of the amount of weight and stress on the wheel caused by the aircraft, the O-ring groove may experience fatigue.

The present disclosure describes various embodiments of O-ring grooves for use with an aircraft wheel, aircraft wheels, as well as an aircraft wheel assembly. Various embodiments of such systems may be utilized in new aircraft designs, or retrofit to existing aircrafts. As will be described in more detail, systems and apparatuses comprising O-ring grooves are provided herein.

Figure 1:
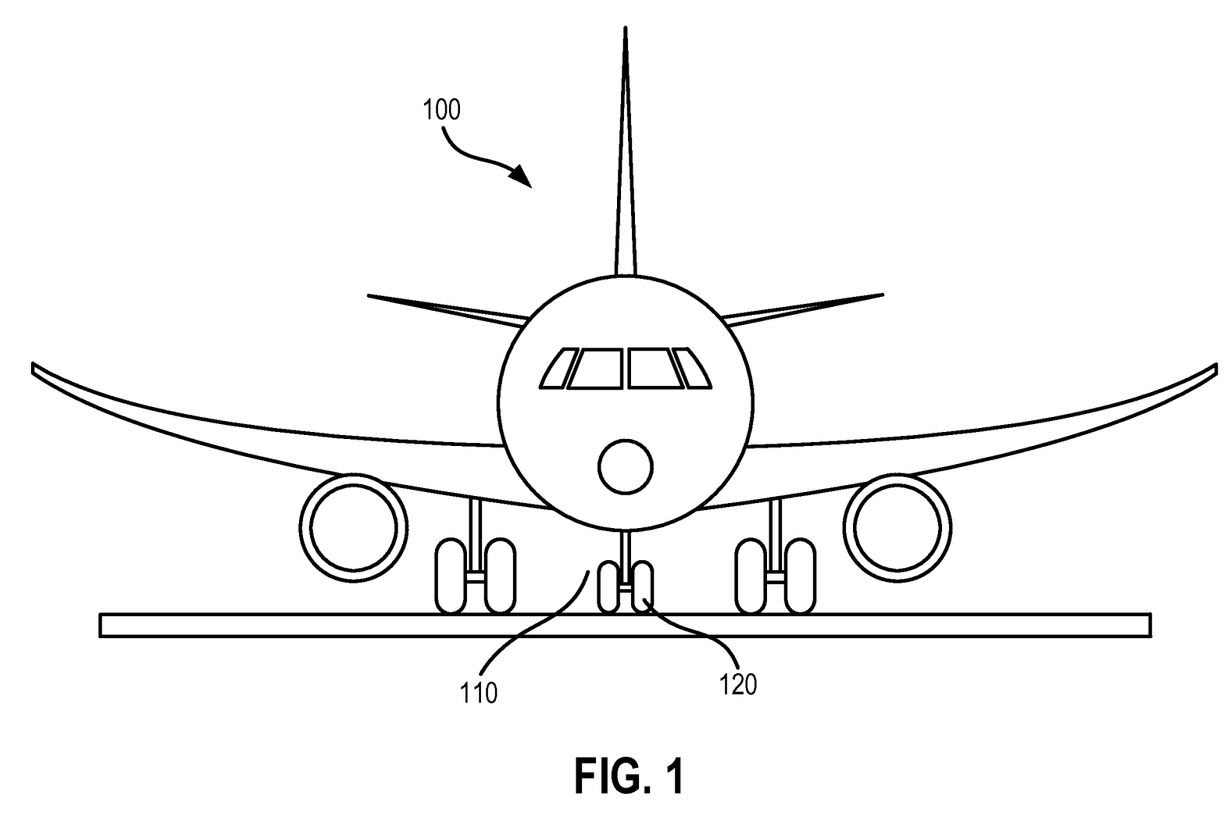
FIG. 1 illustrates a front view of an aircraft, in accordance with various embodiments.

With initial reference to FIG. 1, an aircraft 100 in accordance with various embodiments is illustrated. An aircraft 100 may be any type of aircraft 100 comprising at least a landing gear system 110 including an aircraft wheel assembly 120.

Figure 2A:
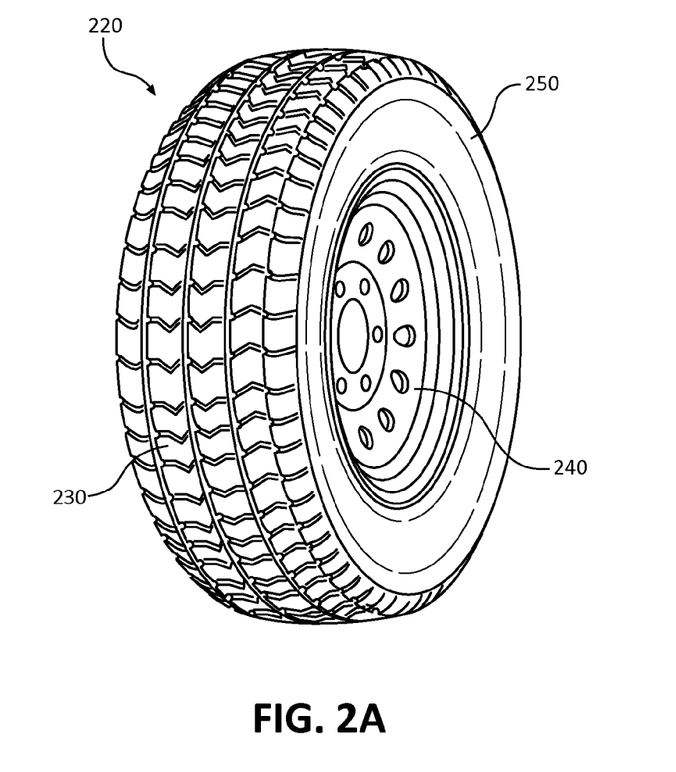
FIG. 2A illustrates a side perspective view of a wheel assembly with a tire, in accordance with various embodiments.
Figure 2B:
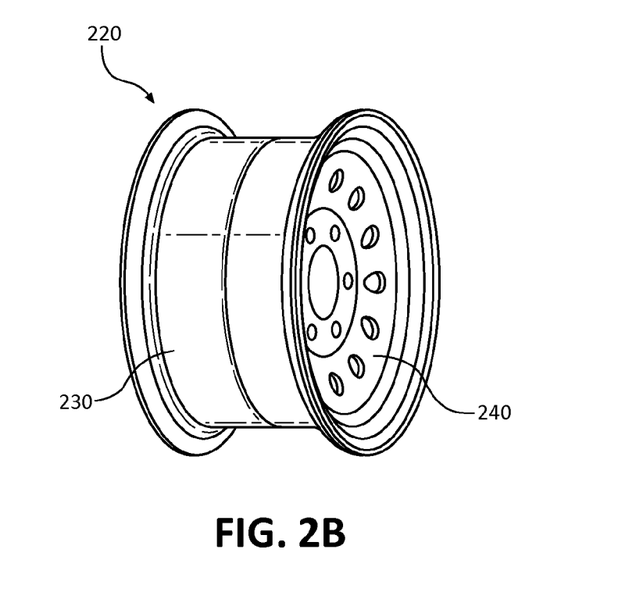
FIG. 2B illustrates a side perspective view of a wheel assembly without a tire, in accordance with various embodiments.

In various embodiments and with reference to FIGS. 2A and 2B, an aircraft wheel 220 may comprise an inboard wheel portion 230 and an outboard wheel portion 240. As used herein, "inboard" and "outboard" are meant to refer to positions along the axis of rotation of the aircraft wheel. For example, in various embodiments, the term "inboard" may refer to a position along the axis of rotation of an aircraft wheel that is closer to the longitudinal centerline of an aircraft and the term "outboard" means a position along the axis of rotation of the aircraft wheel that is further from the longitudinal centerline of an aircraft. However, it should be understood generally that the term "inboard" may refer to a component that occupies a position along the axis of rotation of an aircraft wheel that is axially displaced from another component. In that regard, in various embodiments, the aircraft wheel portions disclosed herein may take on configurations that have mirror image symmetry with the embodiments shown in the Figures. Aircraft wheel 220 may be configured to be operatively coupled to a tire 250. In this regard, tire 250 may be mounted on aircraft wheel 220. Tire 250 may define a pressurizable chamber between tire 250 and aircraft wheel 220.

Figure 3A:
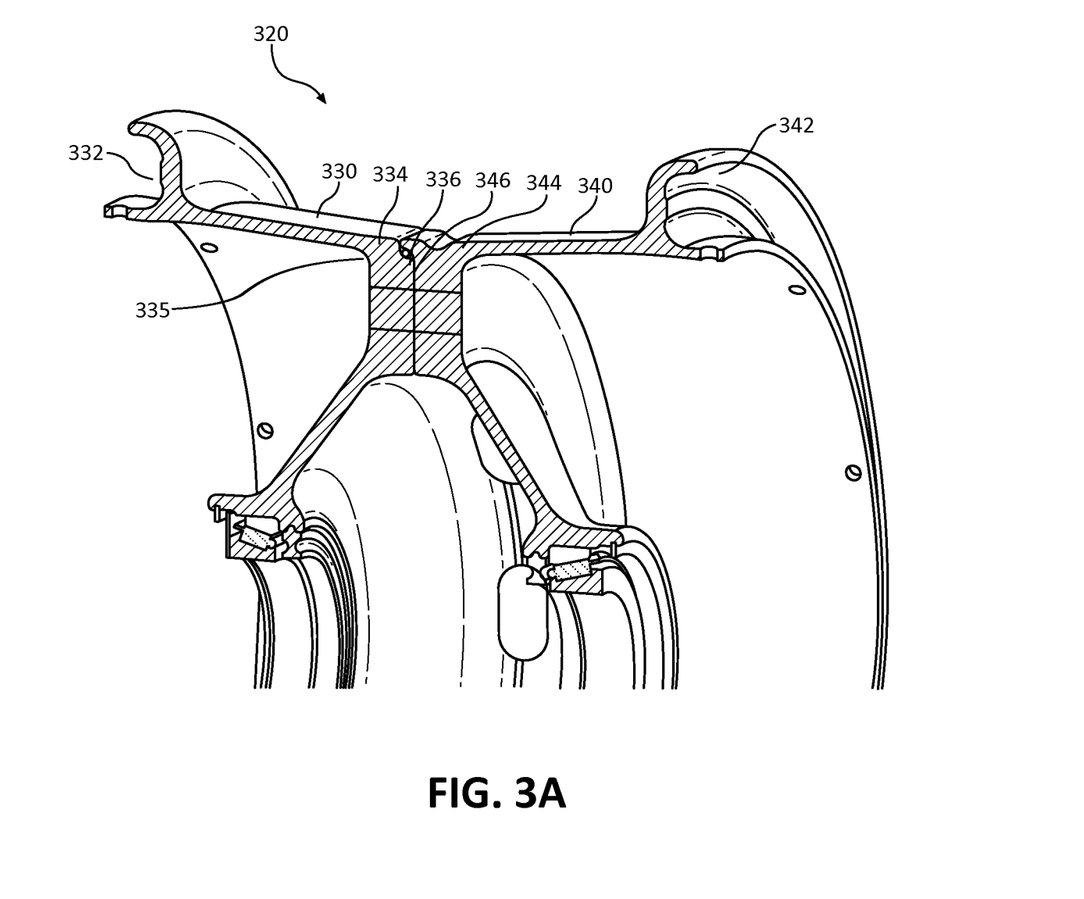
FIG. 3A illustrates a perspective cross-sectional view of a wheel assembly, in accordance with various embodiments.
Figure 3B:
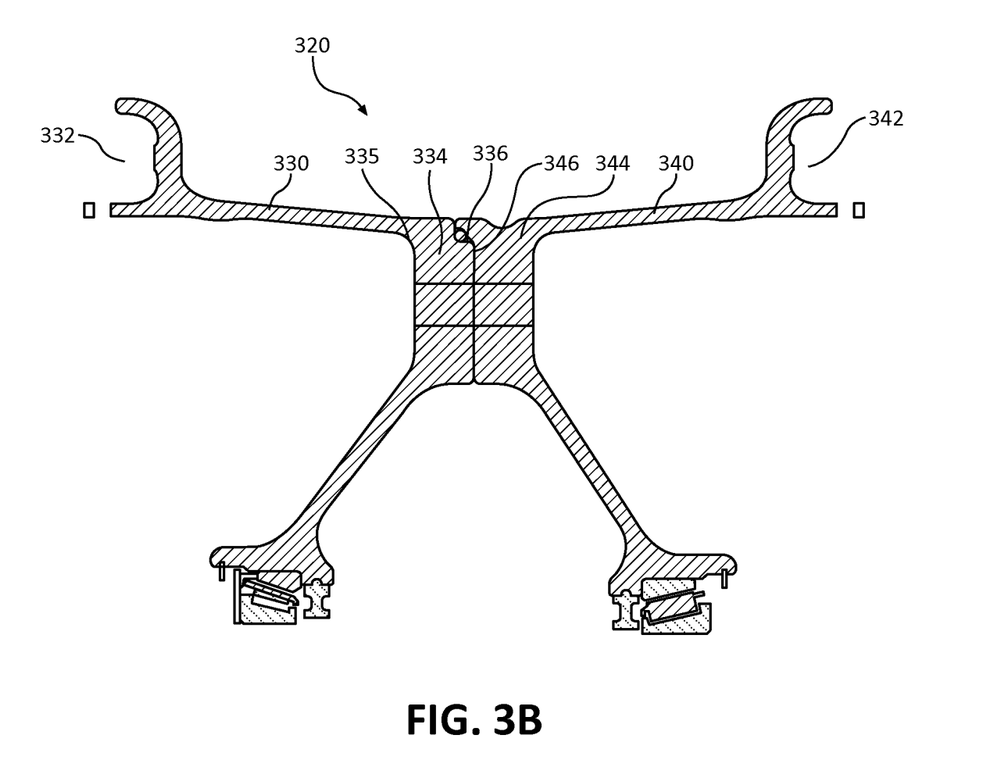
FIG. 3B illustrates a side cross-sectional view of a wheel assembly, in accordance with various embodiments.

In various embodiments, and with reference to FIGS. 3A and 3B, an inboard wheel portion 330 may be configured to provide structural support to an aircraft wheel assembly. Inboard wheel portion 330 may comprise an inboard rim 332 located opposite of an inboard tubewell 334. Inboard rim 332 may be configured to operatively and/or removably couple to a tire. Inboard tubewell 334 may comprise an inboard mating surface 336 on an axially outer edge of the inboard tubewell 334, opposite of an inboard tubewell radius 335. The inboard mating surface 336 of the inboard tubewell 334 may be configured to removably couple to an outboard mating surface 346 of an outboard tubewell 344 of an outboard wheel portion 340.

In various embodiments, inboard wheel portion 330 may be any shape suitable for providing structure and support to an aircraft wheel assembly, such as, cylindrically shaped. Inboard wheel portion 330 may be made of any suitable material. For example, inboard wheel portion 330 may be made from a substantially rigid and durable metal. Inboard wheel portion 330 may also be made from any suitably rigid and sufficiently durable material such as, for example, a plastic, an alloy, a composite, a polymer, and/or any other suitable material.

In various embodiments an outboard wheel portion 340 may be configured to provide structural support to an aircraft wheel assembly. Outboard wheel portion 340 may comprise an outboard rim 342 located opposite of an outboard tubewell 344. Outboard rim 342 may be configured to be operatively and/or removably coupled to a tire. Outboard tubewell 342 may comprise an outboard mating surface 346 on an axially outer edge of the outboard tubewell 342. Outboard mating surface 346 may operatively and/or removably couple to inboard mating surface 336. In this regard, outboard mating surface 346 may operatively and/or removably couple to inboard mating surface 336 by any suitable method and means. For example, outboard mating surface 346 may be coupled to inboard mating surface 336 using fastener bolts. Outboard mating surface 346 may also be coupled to inboard mating surface 336 using a lock-ring design, and/or any other suitable method.

In various embodiments, outboard wheel portion 340 may be any shape suitable for providing structure and support to an aircraft wheel assembly, such as, cylindrically shaped. Outboard wheel portion 340 may be made of any suitable material. For example, outboard wheel portion 340 may be made from a substantially rigid and durable metal. Outboard wheel portion 340 may also be made from any suitably rigid and sufficiently durable material such as, for example, a plastic, an alloy, a composite, a polymer, and/or any other suitable material.

Figure 4A:
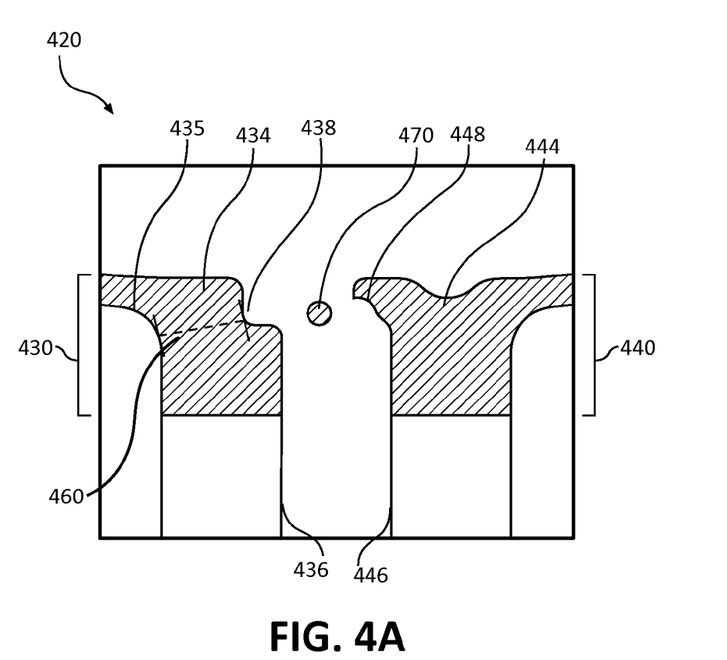
FIG. 4A illustrates an exploded cross-sectional view of an inboard wheel portion coupled to an outboard wheel portion in a wheel assembly, in accordance with various embodiments.
Figure 4B:
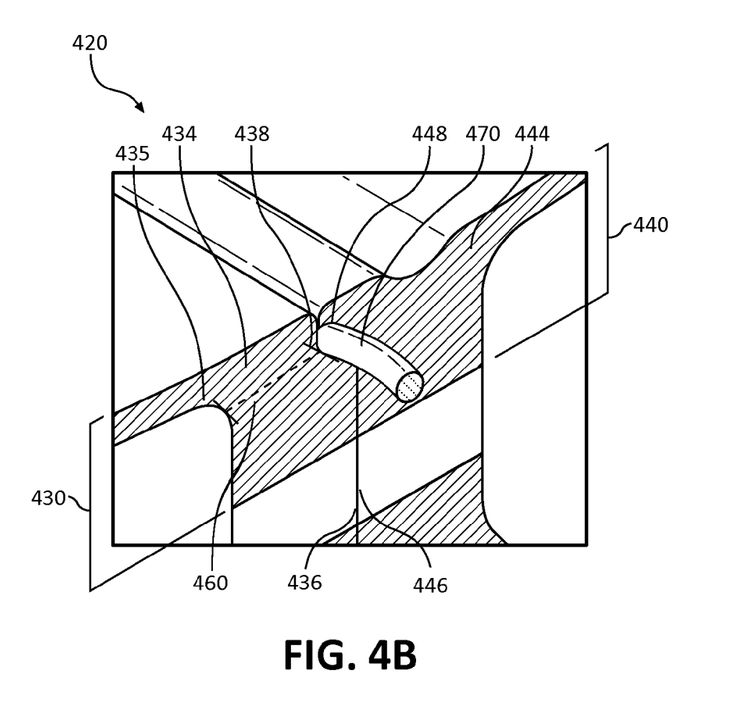
FIG. 4B illustrates a cross sectional view of an inboard wheel portion coupled to an outboard wheel portion in a wheel assembly, in accordance with various embodiments.

In various embodiments, and with reference to FIGS. 4A and 4B, an inboard O-ring groove 438 may be configured to provide structural support for an O-ring 470. An aircraft wheel assembly, in various embodiments, may also comprise multiple inboard O-ring grooves configured to provide structural support to multiple O-rings. Inboard O-ring groove 438 may be formed into a recess extending axially inward on an outer edge of inboard mating surface 436.

Inboard O-ring groove designs of the prior art typically comprise an O-ring groove having a simple circular radius. This simple circular radius results in a small radius in the recess of the inboard O-ring groove, causing an unwanted high stress gradient in the groove. In various embodiments, it may be desirable to decrease the stress gradient by increasing the radius of the inboard O-ring groove 438. The recess of inboard O-ring groove 438 may be formed into any suitable shape resulting in a larger radius to inboard O-ring groove 438, such as, for example, a partially oval shape. In this regard, forming the inboard O-ring groove 438 into a partially oval-shaped recess may have the desired effect of decreasing the stress gradient in the area.

In various embodiments, and with further reference to FIGS. 4A and 4B, an outboard register 448 may be configured to provide structural support for an O-ring 470. An aircraft wheel assembly, in various embodiments, may comprise multiple outboard registers, configured to provide structural support to multiple O-rings. Outboard register 448 may be located on an outer edge of outboard mating surface 446. Outboard register 448 may be any shape suitable to provide structural support for an O-ring 470. Outboard register 448 may be configured to align with inboard O-ring groove 438 when the outboard wheel portion 440 is coupled to the inboard wheel portion 430. In this regard, outboard register 448 and inboard O-ring groove 438 may substantially align together to form a single resulting groove configured to fit an O-ring 470.

Outboard register 448 designs in the prior art typically are shaped substantially flat. A substantially flat outboard register provides no ability to move inboard O-ring groove 438 axially away from inboard tubewell radius 435. In various embodiments, it may be desirable to increase the thickness 460 between inboard O-ring groove 438 and inboard tubewell radius 435 when the outboard wheel portion 440 is coupled to the inboard wheel portion 430, by moving inboard O-ring groove 438 axially away from inboard tubewell radius 435. In this regard, a greater thickness 460 between inboard O-ring groove 438 and inboard tubewell radius 435 decreases the resulting stress gradient in the inboard O-ring groove 438.

In various embodiments, outboard register 448 may be formed into any suitable recess resulting in an enhanced thickness 460 between inboard O-ring groove 438 and inboard tubewell radius 435. In this regard, outboard register 448 may be formed into a recess protruding axially beyond outboard mating surface 446. As an example, in various embodiments where outboard register 448 is aligned with inboard O-ring groove 438, such as when outboard wheel portion 440 is coupled to inboard wheel portion 430, increasing the thickness 460 between inboard O-ring groove 438 and inboard tubewell radius 435 may be accomplished by forming the recess of the outboard register 448 into a partially oval shape. The depth of the recess in outboard register 448 would then allow inboard O-ring groove 438 to be formed closer to the outer edge of inboard mating surface 436, and at a further distance axially away from inboard tubewell radius 435. Because inboard O-ring groove 438 would be closer to the outer edge of inboard mating surface 436, thickness 460 between inboard O-ring groove 438 and inboard tubewell radius 435 would be enhanced. In various embodiments, the radius of the recessed outboard register 448 may be in a 1:1 ratio to the radius of the inboard O-ring groove 438.

In various embodiments, and with further reference to FIGS. 4A and 4B, an O-ring 470 may be configured to seal the aircraft wheel assembly when outboard wheel portion 440 is coupled to inboard wheel portion 430. O-ring 470 may be located between inboard O-ring groove 438 and outboard register 448 when outboard wheel portion 440 is coupled to inboard wheel portion 430. In various embodiments having multiple inboard O-ring grooves and multiple outboard registers, an O-ring 470 may be located between each separately aligned inboard O-ring groove and outboard register.

In various embodiments, O-ring 470 may be any shape suitable for sealing an aircraft wheel assembly 420. In this regard, O-ring 470 may have a substantially circular shape. O-ring 470 may also be cylindrically shaped, or have a rectangular shape. O-ring 470 may be made of any suitable material and may have any suitable coating. For example, O-ring 470 may be made from any flexible and durable rubber material. O-ring 470 may also be made from any suitably elastic and durable material such as, for example, polytetrafluoroethylene (PTFE), ethylene propylene diene monomer (EPDM) rubber, nitrile (Buna-N) rubber, neoprene, Viton fluorocarbon, and/or any other suitable material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:
1. A wheel for an aircraft, comprising:
an inboard wheel portion having an inboard rim located opposite of an inboard tubewell, the inboard tubewell comprising an inboard mating surface;
an outboard wheel portion comprising an outboard register on an outer an outer edge of an outboard mating surface, wherein the outboard register comprises a recess at a radially inner surface;
an inboard O-ring groove defining an inboard recess on an outer edge of the inboard mating surface, wherein the inboard O-ring groove and outboard register recess comprise partially oval shapes in order to increase a thickness between an inboard tubewell radius of the inboard tubewell and the O-ring groove.

2. The wheel of claim 1, wherein the outboard wheel portion comprises an outer rim located opposite of an outboard tubewell, the outboard tubewell comprising the outboard mating surface, wherein the outboard wheel portion is configured to removably couple to the inboard wheel portion.

3. The wheel of claim 1, wherein the outboard register is configured to align with the inboard O-ring groove in response to the outboard wheel portion being coupled to the inboard wheel portion.

4. The wheel of claim 3, further comprising an O-ring located between the inboard O-ring groove and the outboard register.

5. The wheel of claim 1, wherein a radius of the inboard recess of the inboard O-ring groove is in a 1:1 ratio to a radius of the outboard recess of the outboard register.

6. An aircraft wheel, comprising:
an inboard wheel portion having an inboard rim located opposite of an inboard tubewell, the inboard tubewell having an inboard mating surface on the inboard tubewell;
an at least one inboard O-ring groove formed as a recess located on an outer edge of the inboard mating surface;
an outboard wheel portion having an outboard rim located opposite of an outboard tubewell, the outboard tubewell having an outboard mating surface on the outboard tubewell, wherein the outboard mating surface is configured to removably couple to the inboard mating surface; and
an at least one outboard register comprising a recess at a radially inner surface, the outboard register protruding axially beyond the outboard mating surface;
wherein the at least one inboard O-ring groove and recess of the outboard register comprise a partially oval shape in order to increase a thickness between an inboard tubewell radius of the inboard tubewell and the O-ring groove.

7. The aircraft wheel of claim 6, wherein the at least one inboard O-ring groove and the at least one outboard register substantially align when the inboard mating surface is coupled to the outboard mating surface.

8. The aircraft wheel of claim 6, further comprising an at least one O-ring located between the at least one inboard O-ring groove and the at least one outboard register.

9. The aircraft wheel of claim 6, wherein a radius of the recess of the at least one inboard O-ring groove is in a 1:1 ratio to a radius of the recess of the at least one outboard register.

10. A wheel assembly, comprising:
an inboard wheel portion having an outer rim located opposite of an inboard tubewell, the inboard tubewell having an inboard mating surface on the inboard tubewell;
an inboard O-ring groove located on an outer edge of the inboard mating surface;
an outboard wheel portion having an outer rim located opposite of an outboard tubewell, the outboard tubewell having an outboard mating surface on the outboard tubewell, wherein the outboard mating surface is configured to removably couple to the inboard mating surface; and
an outboard register comprising a recess at a radially inner surface, the outboard register protruding axially beyond the outboard mating surface;
wherein the inboard O-ring groove and recess of the outboard register comprise a partially oval shape in order to increase a thickness between an inboard tubewell radius of the inboard tubewell and the O-ring groove.

11. The wheel assembly of claim 10, wherein the inboard O-ring groove and the outboard register align when the inboard mating surface is removably coupled to the outboard mating surface.

12. The wheel assembly of claim 11, further comprising an O-ring located between the inboard O-ring groove and the outboard register.

\* \* \* \* \*